United States Patent [19]

Lescoe et al.

[11] Patent Number: 4,693,320
[45] Date of Patent: Sep. 15, 1987

[54] FIRE SUPPRESSION TEST APPARATUS

[75] Inventors: Paul J. Lescoe, Riverview; Charles E. Scheffler, St. Clair Shores, both of Mich.

[73] Assignee: The United States of America as represented by the Secretary of the Army, Washington, D.C.

[21] Appl. No.: 895,007

[22] Filed: Aug. 7, 1986

[51] Int. Cl.⁴ .............................................. A62C 37/22
[52] U.S. Cl. .................................. 169/61; 123/41.49; 169/62
[58] Field of Search ...................... 123/41.49; 89/1.16; 73/117.2; 169/62, 61, 60

[56] References Cited

U.S. PATENT DOCUMENTS 4,194,571  3/1980  Monte .................................... 169/61
4,296,817  10/1981 Monte .................................... 169/62

Primary Examiner—Jeffrey V. Nase
Assistant Examiner—James M. Kannofsky
Attorney, Agent, or Firm—Peter A. Taucher; John E. McRae

[57] ABSTRACT

A military tank is equipped with an auxiliary (extra) power source located outside the tank. With the tank engine inactive (non-running) the auxiliary power source can be energized to deliver power to the engine transmission and to the air-coolant fans for the engine. A tank, equipped with the auxiliary power source, can be subjected to a realistic live fire test of its fire suppression system even though the tank engine is inoperable or inactive.

5 Claims, 5 Drawing Figures

FIRE SUPPRESSION TEST APPARATUS

GOVERNMENT INTEREST

The invention described herein may be manufactured, used, and by or for the Government for governmental purposes without payment to us of any royalty thereon.

BACKGROUND AND SUMMARY OF THE INVENTION

This invention relates to mechanism for testing fire suppression systems in military tanks. Such systems are used to prevent explosive type fires within the tank, incident to passage of an enemy projectile into or through the tank hull.

In order to accomplish its function the suppression system must be quick-acting; normally the system must achieve a fire-out condition within about 0.2 second after the initial optical flash signal generated by passage of the enemy shell into the hull.

One exemplary fire suppression system comprises a plural number of optical fire sensors positioned in the engine compartment to generate an electrical signal within a few milliseconds after a fire condition is sensed in the compartment. The signal is amplified and applied as a step voltage output to quick-acting valves on one or more storage bottles containing pressurized liquid fire suppressant. One liquid commonly used is C Br F3, tradename Halon 1301.

The storage bottles have fluid connections with fire suppressant spray tubes extending within the engine compartment. Sprayed liquid extinguishes the fire before it can explosively propogate into an unmanageable fireball.

Fire suppression systems of the above-referenced type may be tested by firing HEAT (High Explosive Antitank) rounds into tanks equipped with the systems. Such tests are performed for various reasons, e.g. to test the reliability of the components (sensors, amplifiers, valves and spray tubes), to test the effect of location changes for components (e.g. sensors, and spray tubes), or to test new supplier equipment (qualification tests).

The principal sources for explosive type fires are the fuel tanks; passage of a heat round through a fuel tank will usually generate an explosive-type fire. The fuel tanks are located within the engine compartment, such that the optical sensors must be able to optically view various zones between the engine surfaces and the fuel tank surfaces. Projecting surfaces on the engine components (e.g. turbocharger, generator, starter, oil coolers, etc.) can interrupt or interfere with the optical signal. In order for the tests to be realistic such tests have to be carried out with the engine installed in the compartment. Tests performed in an empty engine compartment are not realistic or definitive.

Unfortunately tank engines are relatively costly hardware items. Preferably engines used in such tests are "scrap" or old engines having only marginal value for combat purposes. Also, the test engines are preferably cannabilized of operating internal parts, e.g. pistons, injectors, crankshafts, etc., since the components can be destructed during the test period.

In one typical tank power plant the engine is an air-cooled engine wherein the coolant air fans are driven from the engine through gearing contained within the transmission. Such fans produce a significant flow of air through the engine compartment during normal operations (i.e. in combat situations). Fire suppression system testing is preferably carried out with the fans running; the significant air flow through the compartment can affect the progress of the exploding fireball, as well as the direction and spray pattern of the liquid (vapor) fire suppressant. If the fans are not running the tests may not be conclusive or fully informative on the merits of the tested equipment.

The present invention relates to an add-on mechanism for facilitating the realistic testing of fire suppression systems without requiring the engine to be running during the test period. The add-on mechanism comprises an auxiliary (external) power source connected to the transmission to drive the air coolant fans even though the engine is inoperable or inactive. The principal object of the invention is to permit the testing operations to be carried out with scrap or cannabilized engines having minimal value for combat purposes.

THE DRAWINGS

Figure 1:
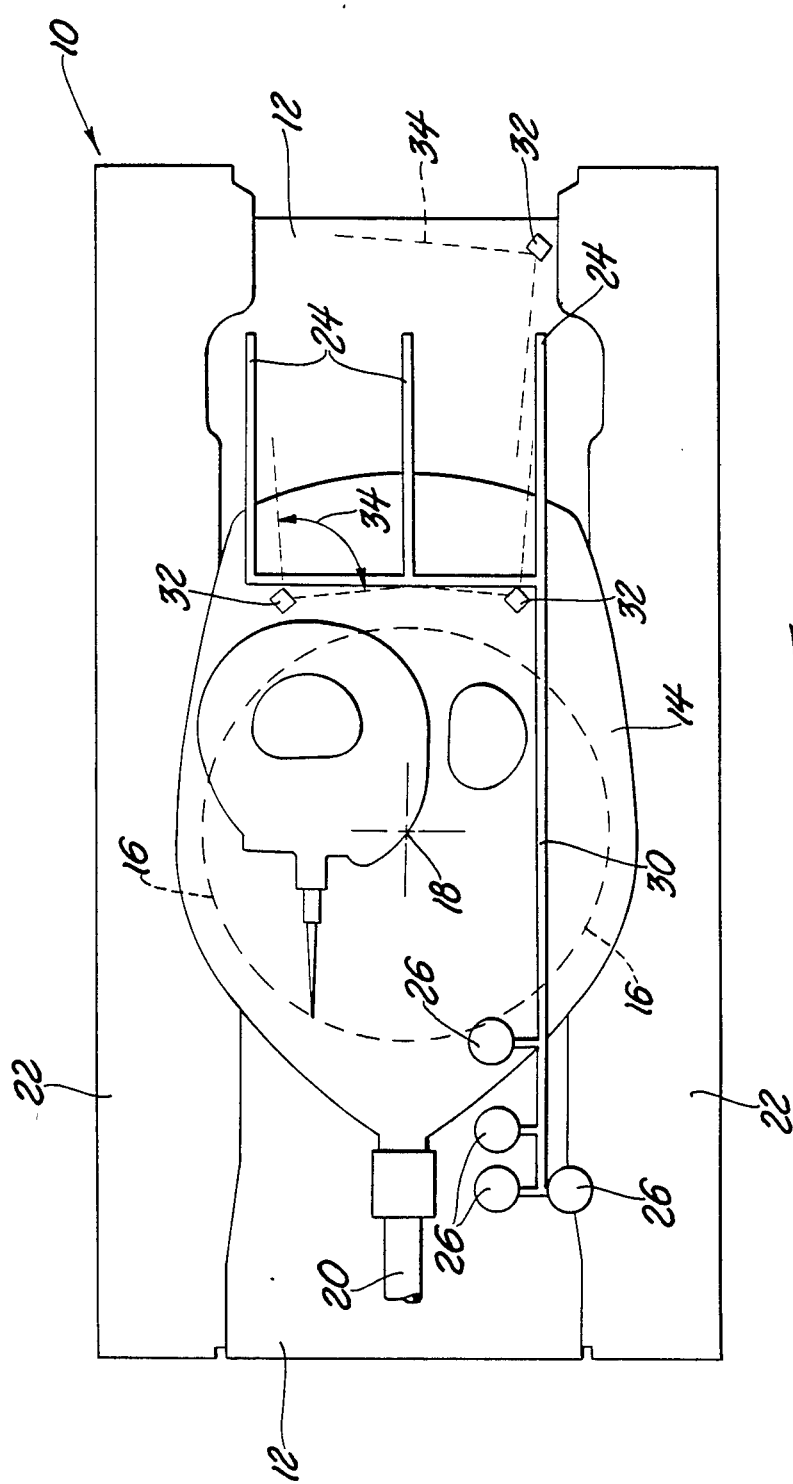
FIG. 1 is a schematic plan view of a military tank equipped with a fire suppression system.
Figure 2:
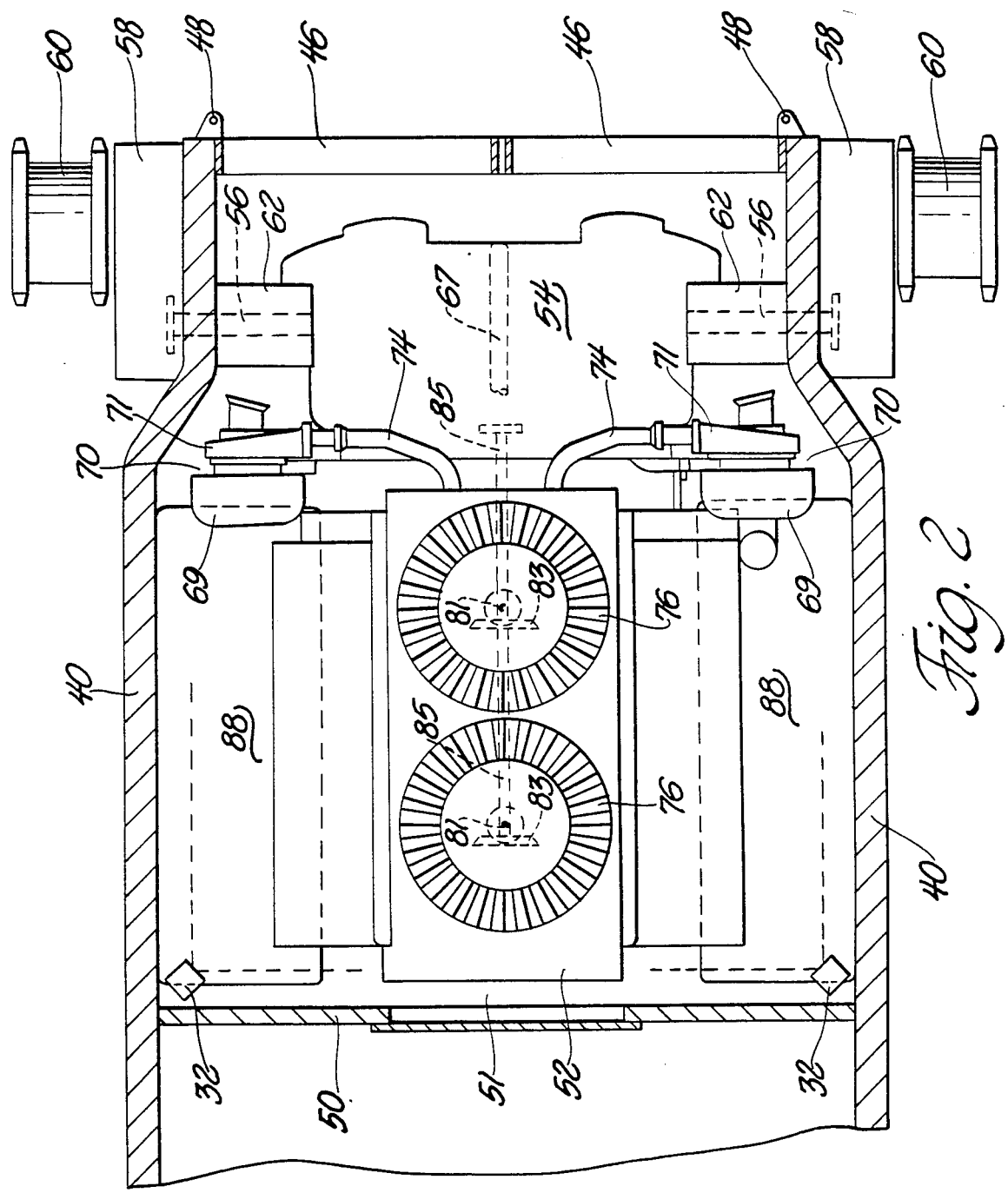
FIG. 2 is a fragmentary plan view of engine-transmission componentry arranged in an aft compartment of a military tank. The drawing is an outline envelope view of the componentry, showing only the general arrangement.

Referring in greater detail to FIG. 1, there is shown a military tank 10 comprising a hull 12 and turret 14. The turret includes the conventional ring (race) structure 16 (and associated motor) for rotating the turret around central axis 18, to facilitate proper aiming of main gun 20. The usual ground-engaged endless tracks are provided at opposite sides of the hull beneath fenders 22, to move the tank cross-country.

The aft end of the hull defines an interior compartment for containment of the propulsion power plant (engine plus transmission). The power plant is not visible in FIG. 1. However, FIG. 1 shows three horizontal spray tubes 24 within the compartment for discharging pressurized liquid fire suppressant into said compartment to extinguish an emergent fireball generated by passage of an enemy round of ammunition into the compartment.

The pressurized liquid fire suppressant is stored in three bottles (steel tanks) 26 located in a forward part of the hull away from the high temperatures in the engine compartment. Each bottle is equipped with a fast-acting valve (solenoid or squib-actuated) for discharging liquid suppressant into a supply pipe 30 leading to spray tubes 24. The valve (or valves) is/are opened only when electrical actuation signals are applied to the valve actuator(s).

The valve actuator signals are generated in one or more (e.g. three) fire detectors 32 located at pre-specified points in the engine compartment. Each detector 32 may be an optical detector responsive to radiation of a wavelength that is associated with specific fireball conditions resulting from passage of a HEAT (high explosive) round through a fuel tank. The engine compartment has two such fuel tanks therein.

Each detector 32 preferably has a discrimination capability whereby it can distinguish the fuel fireball from other optical radiations (e.g. matches, rifle flashes, headlights, slow growth fires, etc.). Each detector 32 is an optically-activated electric signal generator having a wide field of view, designated by numeral 34 in the drawing. A signal amplifier is associated with detectors 32 for transmitting a useful (amplified) signal to the electric actuators on bottles 26. Useful systems are shown in U.S. Pat. Nos. 3,825,754 and 4,101,767, and 3,685,587, and 4,270,613. Electrical wiring is not shown in FIG. 1.

FIG. 1 illustrates the military tank in a schematic fashion; it is intended to show generally how a representative fire suppression system is operatively installed in the tank. FIGS. 2 through 5 illustrate the general arrangement of the power plant in the aft end of the tank hull.

HULL CONSTRUCTION

Figure 3:
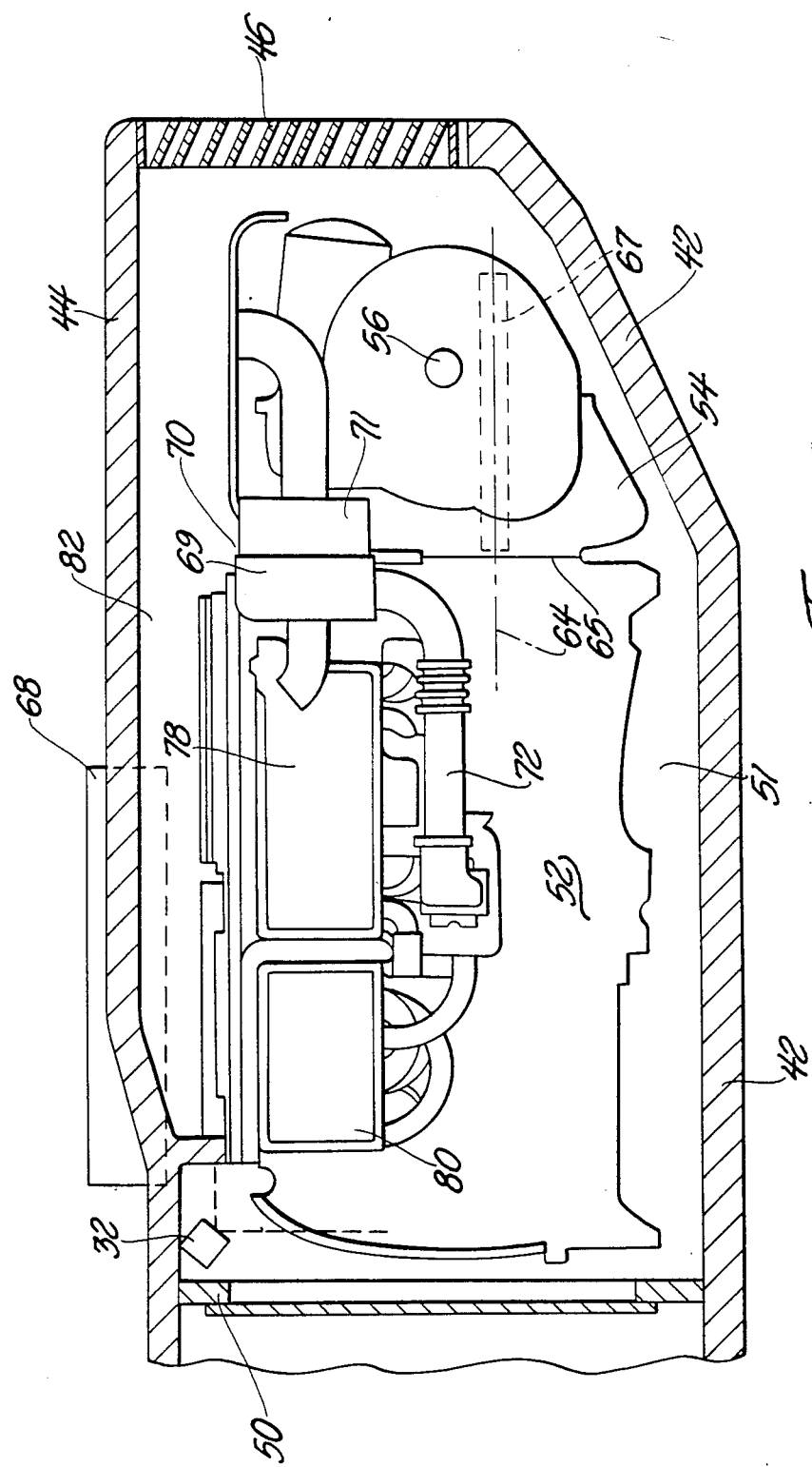
FIG. 3 is a side elevational view of engine-transmission componentry of the type shown in FIG. 2.

The tank hull includes two side walls 40, bottom wall 42, and top wall 44. The hull rear wall is comprised of two grille doors 46 having hinged connections 48 with side walls 40. The extreme aft end of bottom wall 42 slopes upwardly as it approaches grille doors 46 (FIG. 3). A bulkhead 50 extends across the hull to define the front wall of the propulsion power plant compartment 51. Hull upper wall 44 contains additional grille doors 53 (FIG. 4) that serve to supply coolant air to an internal combustion engine 52 located in compartment 51.

POWER PLANT CONSTRUCTION

Figure 4:
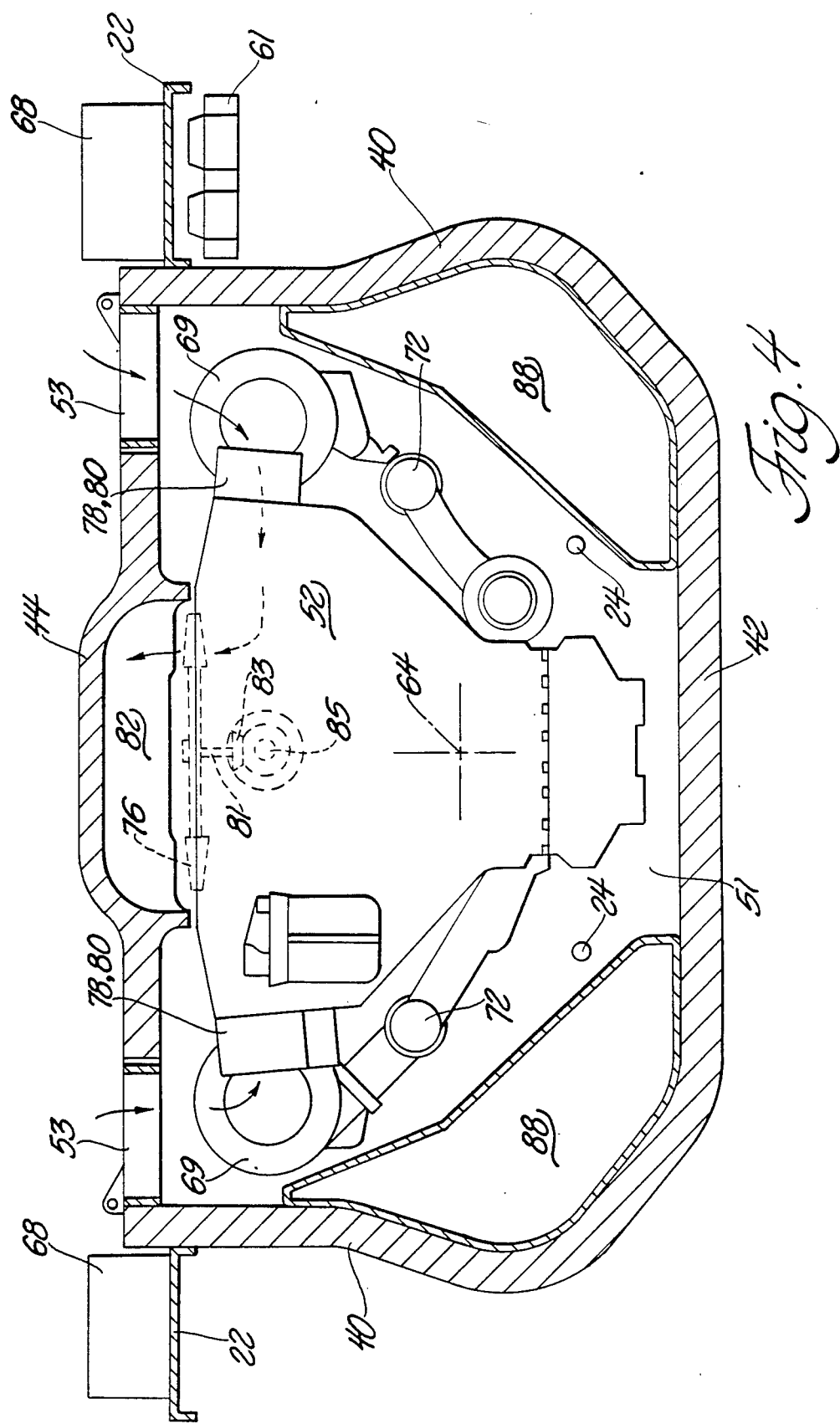
FIG. 4 is a front elevational view of the engine depicted in FIGS. 2 and 3.

The power plant comprises an air-cooled engine 52 and transmission 54. Engine 52 can be a twelve cylinder internal combustion engine manufactured by Teledyne Continental Motors under the designation AVDS-1790. The transmission can be Model CD 850-6A, manufactured by Detroit Diesel Allison Division of General Motors Corp. The transmission supplies power to two output shafts 56 (FIG. 2) that connect with gearing in external hub units 58, to thus drive sprocket wheels 60 for tracks 61 (FIG. 4). Multi-disk brake systems within housings 62 apportion the power flow to provide steering capability.

Engine 52 is of the V-type, with six cylinders in each bank. The crankshaft is mounted for rotation on longitudinal axis 64 to transmit power to a transmission input shaft 67. The transmission input shaft 67 extends entirely through the transmission housing, i.e. from engine-transmission interface 65 to the right end of the transmission housing. The rear (right) end of shaft 67 is internally splined (FIG. 5) to form a power take-off connection for non-illustrated equipment. The transmission contains a torque converter, planetary gearing, and various disc type clutches to provide a range of speed ratios.

Combustion air for the engine is passed through filter boxes 68 located on fenders 22. Large diameter hoses convey filtered air from boxes 68 to compressors 69 that form parts of superchargers 70. An intake manifold system 72 delivers compressed air to the engine cylinders (buried within the engine). Exhaust combustion products are conveyed through ducts 74 (FIG. 2) to the turbine sections 71 of superchargers 70. The exhaust products are eventually discharged from compartment 51 through grille doors 46.

ENGINE COOLING

The individual engine cylinders are externally finned. Shrouding around the fin edges permit coolant air to flow through the fin spaces to cool the individual cylinders. Two large fans 76 are located atop the engine (above the engine V) to draw coolant air through the fin spaces.

A transmission oil cooler 78 and engine oil cooler 80 are located outboard from each cylinder bank. Each cooler comprises a plural number of oil-conducting tubes equipped with external heat transfer fins. Fans 76 draw coolant air across the finned tubes and thence around the engine cylinders to cool the oil and hot engine surfaces. The air is exhausted upwardly into a channel 82 that leads the air rearwardly through grille doors 46.

Each fan 76 includes a vertical shaft 81 that has a geared connection 83 with a horizontal shaft 85 extending forwardly from transmission 54. Each shaft 81 may have a thermostatically operated clutch means therein for disconnecting the associated fan from the drive system. In normal operation gearing within transmission 54 transmits a drive force from input shaft 67 to horizontal shaft 85 and the associated fans 76.

FUEL TANK ARRANGEMENT

Liquid (diesel) fuel for the engine is stored in two tanks 88 positioned against hull side walls 40, i.e. outboard from the engine. Each tank extends from bulkhead 50 rearwardly to a point approximately in line with superchargers 70. The tanks are sized to take up a considerable portion of the space between the hull side wall and the side surface of the engine (consistent with access-maintenance considerations) to provide as great a fuel capacity as possible (for maximum mileage between refuelings). The large size tanks pose somewhat of a problem as regards fire suppression capability, in that the clearance spaces alongside the engine side surfaces are relatively restricted. The optical sensors 32 and spray from tubes 24 may not fully penetrate into the clearance spaces.

FIRE SUPPRESSION SYSTEM

The fire suppression system is constructed as shown generally in FIG. 1. FIG. 4 shows two liquid fire suppressant spray tubes 24 extending longitudinally within compartment 51 in the spaces between the engine and fuel tanks 88. Each tube may have a diameter on the order of one inch. Small diameter ports (orifices) are formed in each tube at spaced points along the tube length. Spray pattern from each tube is generally in an upward direction along the inboard face of the associated fuel tank. The aim is to provide an upflowing blanket of vaporizable suppressant at those points where an enemy projectile is likely to be emerging from the fuel tank.

Optical fire sensors 32 are located in corner areas of compartment 51 to optically view various zones most likely to be flame sources.

FIG. 5—ADD-ON MECHANISM

Figure 5:
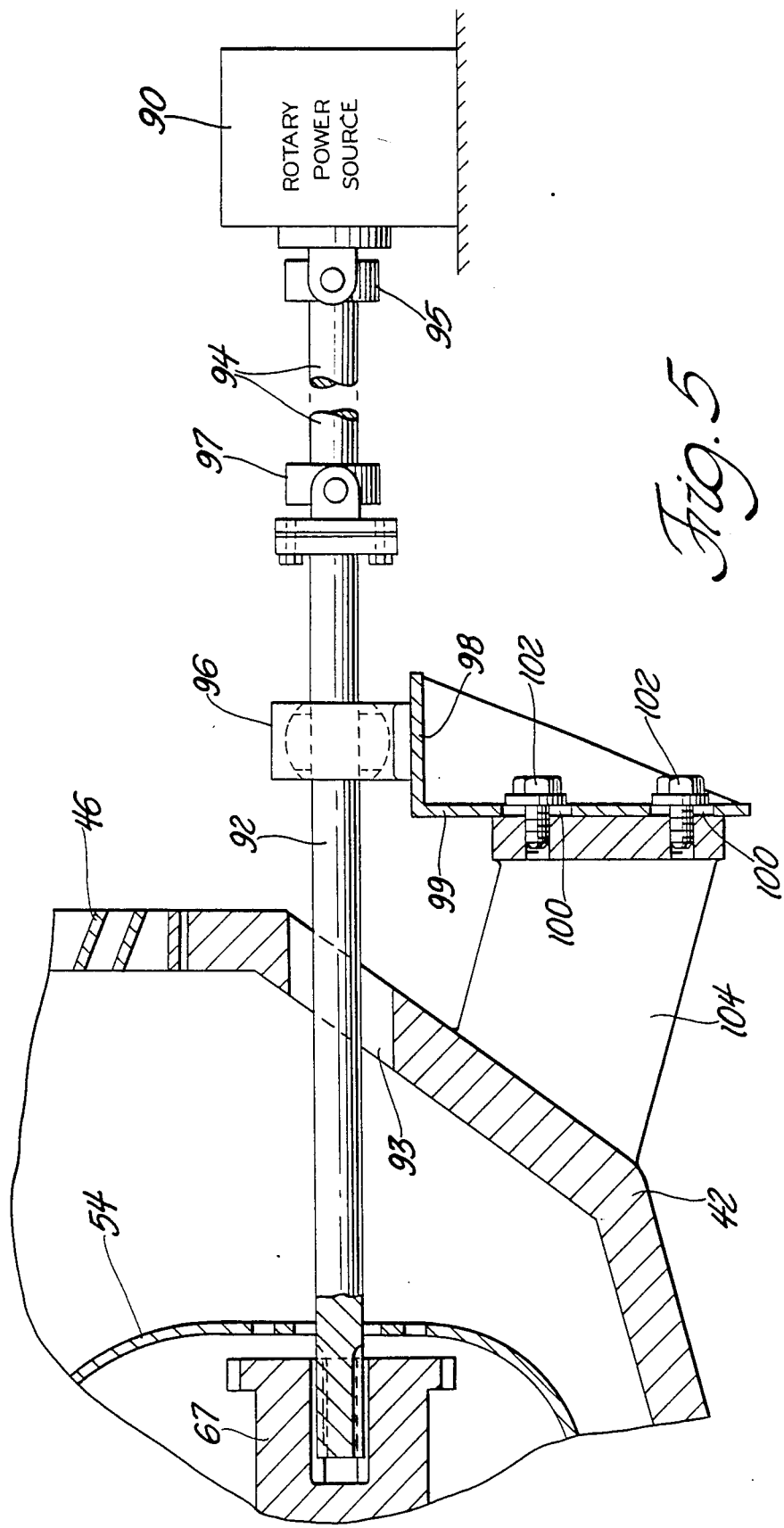
FIG. 5 illustrates an add-on mechanism we have devised to facilitate fire suppression testing on the engine-transmission system shown in FIGS. 2 through 4.

FIG. 5 illustrates one form that our invention can take. The mechanism functions as an add-on power system for running fans 76 without running engine 52. This enables a "scrap" or cannibalized engine to be used when test rounds are fired into the hull. Should the engine be damaged the economic cost will be relatively slight.

Running fans 76 during the test is advantageous in that an air flow representative of normal-run conditions is obtained. Such an air flow can influence the pattern and direction taken by the fire extinguishant discharged from tubes 24. The fan 76 air flow can also redistribute or spread flames to produce secondary ignition. It is desirable that ammo testing of the fire suppressant components (24,26 or 32) be carried out with fans 76 running (even though engine 52 is inoperable).

The add-on power system comprises an external power source 90, a first horizontal shaft 92, and a second shaft 94. Power source 90 can be an electric motor or an internal combustion engine.

Shaft 92 extends through a hole or slot 93 formed in the tank wall at a point beneath doors 46. The left end of shaft 92 is externally splined to interfit with internal splines formed in the rear end of transmission input shaft 67.

Shaft 94 has universal joints 95 and 97 at its opposite ends for operatively joining that shaft to the power source and to shaft 92. Shaft 94 is employed in the system to compensate for elevational differences between the power source output shaft axis and the shaft 92 axis. Shaft 94 also compensates for shaft attitude (axis angle) differences coming under the general term "misalignment".

Test operations are conducted on a proving ground where the terrain may be rough and uneven. Shaft 94 compensates for terrain unevenness that could otherwise interfere with operation of the add-on power system were power source 90 to be directly connected to shaft 92 without misalignment compensation.

Shaft 92 extends through a self-aligning bearing block 96 that is positioned on a platform member 98. Member 98 includes a vertical wall 99 that is formed with vertical slots 100 therethrough. Bolts 102 extend through slots 100 into threaded holes in a pre-existing pintle mount 104. The towing pintle (not shown) is removed from mount 104 before attachment of platform member 98 to the pintle mount.

Slots 100 permit limited vertical adjustment of platform 98 and the associated bearing means 96. Shaft 92 may thus have its attitude adjusted slightly to achieve a proper connection with shaft 67. The adjustment compensates for a variety of manufacturing tolerance variations associated with building and/or assembling transmission 54, pintle bracket 104, platform 98 and bearing block 96.

In operation, power source 90 delivers rotary power to shafts 94 and 92. Shaft 92 delivers power to transmission input shaft 67. The transmission in turn delivers a rotary drive force to fans 76 in normal fashion. The only operational difference is in the fact that transmission input shaft 67 is powered by shaft 92 rather than by the engine drive shaft.

The add-on power source offers a way to conduct a realistic test of the fire suppression componentry without having to run the tank engine. A worn "scrap" engine can be used thereby reducing test costs and/or permitting a greater number of tests to be run.

We wish it to be understood that we do not desire to be limited to the exact details of construction shown and described for obvious modifications will occur to a person skilled in the art, without departing from the spirit and scope of the appended claims.

We claim:

1. In a military tank that includes a hull having a compartment in its aft end sized to house a propulsion power plant; a power plant located within the compartment; said power plant comprising an internal combustion engine occupying the forward portion of the compartment, and a transmission occupying the rearward portion of the compartment; said engine being an air-cooled engine wherein fan means moves compartment air across the engine cylinders and through exhaust openings in a hull wall; said transmission having gear means therein normally operable to drive the fan means when the engine is running; and fire suppression means within the hull, said fire suppression means comprising fire detection means within the compartment, liquid fire suppressant spray means within the compartment, and liquid fire suppressant supply means within the hull forwardly from the power plant compartment, said supply means being electrically connected with the detection means whereby fire suppressant is delivered to the spray means when the detection means senses a fire condition in the compartment:

the improvement comprising an add-on means for running the fan means without running the engine, whereby the fire suppression means can be tested with coolant air flowing through the compartment even though the engine is inoperable; said add-on means comprising a first horizontal shaft extending through the rear wall of the hull into the power plant compartment, an external power source, a second shaft interconnecting the power source and first shaft, a first universal joint between the two shafts, and a second universal joint between the power source and the second shaft.

2. The improvement of claim 1 wherein said first shaft has a splined end extendable into a female splined opening in a power take-off member within the transmission, whereby the first shaft is enabled to deliver rotary power to the transmission and to the associated fan means.

3. The improvement of claim 2 and further comprising means carried by the tank hull for supporting the first shaft; said shaft-support means comprising a platform underlying the shaft at a point intermediate its ends, and a self-aligning bearing means positioned on the platform in surrounding relation to the shaft.

4. The improvement of claim 3 wherein the platform is bolted to a pre-existing pintle mount carried on the hull rear wall.

5. The improvement of claim 4 wherein the platform includes a vertical wall engageable with the pintle mount, said vertical wall having a plural number of vertical slots therethrough designed to accommodate attachment bolts screwed into the pintle mount; said vertical slots permitting limited vertical adjustment of the platform, with corresponding changes in shaft attitude.

* * * * *